2,628,501

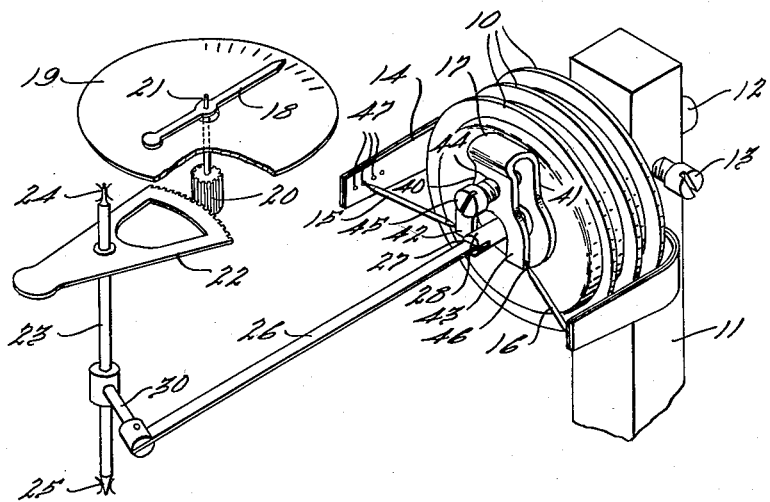
Fig.1.
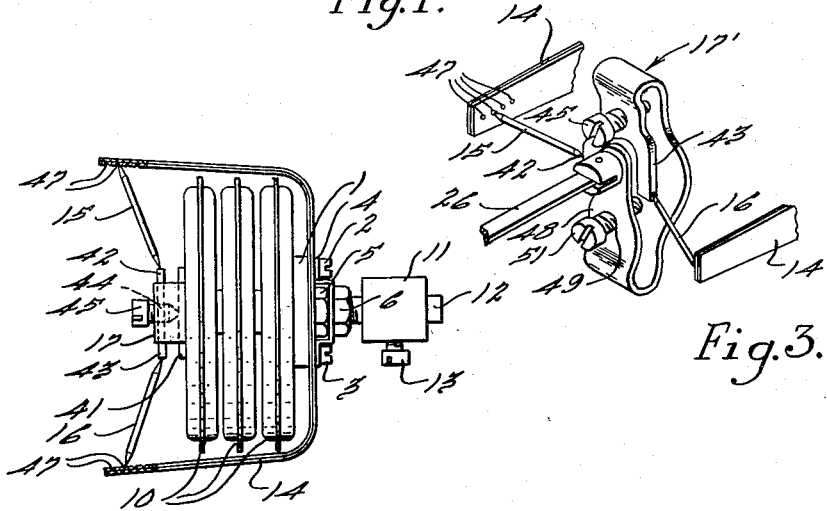
Fig. 2.
Fig. 3.
INVENTOR
Emil Knapp.
BY Myron J. Seibold
ATTORNEY Patented Feb. 17, 1953

UNITED STATES PATENT OFFICE 2,628,501

TEMPERATURE COMPENSATION ADJUSTMENT FOR PRESSURE RESPONSIVE INSTRUMENTS

Emil Knapp, Floral Park, N. Y., assignor, by mesne assignments, to Kollsman Instrument Corporation, Elmhurst, N. Y., a corporation of New York Application April 1, 1949, Serial No. 84,849

18 Claims. (Cl. 73—386)

This invention relates to compensation adjusting means in general and more particularly to the initial adjustment of the temperature compensation of instruments which are responsive to variations in pressure such as altimeters, barometers and pressure indicators.

An object of the invention is to provide an improved temperature compensating adjustment means by which the amount of temperature compensation can be varied to compensate a particular instrument.

A further object of the invention is to provide a convenient and accurate means for vernier adjustment of the amount of compensation utilized in an instrument.

Another object of the invention is to provide adjustment means for both temperature compensation and for zero adjustment of a pressure responsive instrument.

Further objects and features of the invention will be readily apparent to those skilled in the art from the specification and appended drawing illustrating certain preferred embodiments in which:

Figure 1 is a perspective view of an instrument embodying the present invention.

Figure 2 is a plan view of the aneroid device and the temperature compensation adjustment means.

Figure 3 is a perspective sectional view of a modified form of the invention.

The temperature compensation adjustment means according to the present invention, as specifically illustrated in Figures 1 and 2, comprises a return bent resilient member 17 which is mounted to the free end of a pressure responsive aneroid means 10. A temperature responsive, U-shaped, bimetal yoke 14 is mounted to the other end of the pressure responsive aneroid means 10 to threaded shaft 12 by nuts 5 and 6. Shaft 12 is held in place in mounting post 11 by screw 13.

To slotted post 27 on the aneroid group 10 is connected a link 26 by pin 28. Link 26 is connected at its other end to an arm 30 mounted on a rock shaft 23 rotating in bearings 24 and 25. Mounted on rock shaft 23 is a geared sector 22 which meshes with a pinion 20 and drives a pointer 18 by means of shaft 21. Movements of pointer 18 may be read by reference to stationary dial 19 carrying suitable indicia.

The compensating adjustment of this invention as specifically shown in Figure 1 comprises a return bent, resilient member 17 having legs 40 and 41 with the leg 41 permanently fixed to the free end of the aneroid group 10. Leg 40 is bifurcated into two additional legs 42 and 43 to which are connected the force applying links 15 and 16 in holes 46 in the edges of the legs. Leg 40 has a threaded hole 44 therethrough in which adjusting screw 45 is mounted with its end bearing against leg 41 as an abutment. The temperature responsive member 14 has a series of holes 47 in its inner faces into which the remote ends of links 15 and 16 are received.

In the temperature compensation means herein shown, the force exerted upon the aneroid group 10 by links 15 and 16 to oppose expansion of the aneroid group is a function of the stress in the bimetal 14 which varies with the temperature and the angular relationship of the links 15 and 16 which varies with the position of the aneroid group. The adjusting means of the present invention provides a simple and inexpensive but very accurate vernier adjustment for the initial angular relation of the links 15 and 16. The holes 47 in the adjacent faces of the legs of the bimetal yoke 14 receive the remote ends of the links 15 and 16 to provide a coarse adjustment of the link relation. After the coarse adjustment is made, rotation of the adjusting screw 45 effects movement of the legs 42 and 43 toward and away from the aneroid group so as to exactly locate the inner ends of the links. It will be particularly noted that in this adjustment the rigid mounting of the aneroid group is not disturbed and only the mounting of the adjacent ends of the links is moved.

In Figure 3 is illustrated a modified form of the invention comprising a double return bent, resilient member 17' providing a second return bent leg 48 to which the link 26 may be attached. Through threaded hole 49 in leg 48 a second adjustment screw 51 operates. The temperature compensation adjusting parts are as shown in Figure 1.

In the modification as shown in Figure 3, a zero adjustment means is provided in addition to the temperature compensation adjustment means. The temperature compensation adjustment is accomplished as previously described and the zero adjustment is accomplished by turning screw 51 on leg 48 to move link 26 to effect a movement of the instrument pointer.

While certain preferred embodiments of the invention have been specifically disclosed, it is understood that the invention is not limited thereto, as many variations will be readily apparent to those skilled in the art and the invention is to be given its broadest possible in-

What is claimed is:

1. In an indicating instrument, pressure responsive means having one end secured to the instrument casing, a temperature responsive, resilient U-shaped, bimetallic member embracing the pressure responsive means and self biased to supply a force in opposition to the motion of the pressure responsive means, a return bent, resilient member having one leg mounted on the free end of the pressure responsive means, links interconnecting the legs of the bimetallic member and the free leg of the return bent member, a screw adjusting means provided on the return bent member by which the space between its legs and therefore the angle between the links connecting the bimetallic member to the return bent member can be varied to vary the amount of temperature compensating force applied to the free end of the pressure responsive member.

2. In an indicating instrument, the combination of pressure responsive means fixed on one end to the instrument casing and having its other end free, a U-shaped, bimetallic, temperature responsive strip having an intermediate portion thereof fixedly mounted and its legs projecting parallel to the axis of the pressure responsive means, a return bent resilient member having one leg mounted on the free end of the pressure responsive means, links connecting the ends of the U-shaped member to the free leg of the return bent member, and screw adjusting means provided on the return bent member for varying the angle between the connecting links and thereby varying the amount of temperature compensation applied to the pressure responsive member means.

3. In a pressure sensitive measuring instrument, an aneroid capsule mounted at one end to the instrument casing, a resilient, substantially U-shaped, temperature responsive member fixed mounted at an intermediate portion thereof and having its two legs extending parallel to the axis of the aneroid capsule, the free ends of the U-shaped member having a plurality of mounting holes on their inside surfaces providing a rough adjustment for the compensating force, a return bent, resilient member mounted by one leg to the free end of the aneroid capsule, means received in said mounting holes for connecting the ends of the legs of the temperature responsive member to the free leg of the return bent member for applying a temperature varied force opposing motion of the aneroid capsule, and fine adjusting means on the return bent member for varying the compensating force by changing the angle at which the forces from the two legs of the temperature responsive member interact.

4. In an indicating instrument, the combination of pressure responsive means mounted on one end to the instrument casing and having its other end connected to the indicator of the instrument, a temperature responsive, bimetallic, substantially U-shaped member fixedly mounted at its base and having its legs extending parallel to the axis of the pressure responsive means, the inside surfaces of the legs of the temperature responsive member having a plurality of spaced holes for providing a rough adjustment of the compensation utilized, links for connecting the legs of the U-shaped member to the free end of the pressure responsive means and for applying the force of the temperature responsive member to the pressure responsive means, a return bent spring biased member secured by one leg to the free end of the pressure responsive means and having its free leg receiving the links from the temperature responsive member, the free leg of said return bent member having mounting holes, with the ends of the links disposed in the mounting holes in said temperature responsive and return bent members, and screw adjusting means for varying the space between the legs of the return bent member and the angle at which the ends of the links act on the pressure responsive means.

5. In an indicating instrument of the character described, the combination of pressure responsive means mounted on one end to the instrument casing and having its other end connected to the indicator of the instrument, a U-shaped bimetallic member fixedly mounted at its base and having its legs parallel to the axis of the pressure responsive member, links for connecting the ends of the temperature compensating member to the free end of the pressure responsive means, a series of spaced holes on the inside surface of and at the ends of the legs of the temperature responsive member into which the links can be mounted, a resilient member secured on one side to the free end of pressure responsive means and return bent on itself to provide an adjustable free end, holes in the side edges of the free end of said resilient member receiving said links, and screw adjusting means for varying the position of the free end of said resilient member to adjust the compensation applied to the pressure responsive means.

6. In an indicating instrument of the character described, the combination of pressure responsive means mounted on one end to the instrument casing and having its free end connected to the instrument mechanism, a temperature responsive, bimetallic, resilient, U-shaped member fixedly mounted at its base and having its legs disposed parallel to the axis and on opposite sides of the pressure responsive means, a resilient, double return bent member having its flat side fixed to the free end of the pressure responsive means and having its two return bent ends self biased closed, links connecting the free ends of the U-shaped member to one of the legs of the double return bent member so that they apply a force in opposition to the movement of the pressure responsive means, the second leg of the double return bent member having a means for connection to the instrument mechanism, and a pair of adjusting screws in the double return bent member for adjusting the positions of its legs, one in the first leg providing an adjustment for the amount of compensation and the other in the second leg providing means for zero adjustment of the instrument.

7. In an indicating instrument of the character described, the combination of pressure responsive means mounted on one end to the instrument casing and having its other end free to operate the instrument mechanism, a temperature responsive, bimetallic, substantially U-shaped member fixedly mounted at its base and having its legs extending parallel to the axis of the pressure responsive means, a plurality of spaced holes on the inside surfaces of the legs of the temperature responsive member for providing a rough adjustment of the compensation utilized, links having one end of each disposed in said holes for connecting the temperature responsive to the free end of the pressure responsive means, a resilient, double return bent member mounted on the free end of the pressure responsive means and having its two return bent legs adjustably movable, said links being connected to one of said return bent legs, the other of said return bent legs being connected to the instrument mechanism, adjusting means on said one return bent leg to vary the amount of temperature compensation utilized, and adjusting means on said other return bent leg to zero adjust the instrument.

8. In an indicating instrument of the character described, the combination of pressure responsive means mounted on one end to the instrument casing and having its other end movable to operate the instrument mechanism, a temperature responsive, bimetallic, substantially U-shaped member mounted at its base and having its legs extending parallel to the axis of the pressure responsive means, a plurality of holes on the inside surfaces of the ends of the legs of the temperature responsive member for providing a rough adjustment of the compensation utilized, links mounted in said holes for connecting the temperature responsive member to the free end of the pressure responsive means, a resilient, double return bent member, self biased closed and with a first leg bifurcated and the second leg having a straight section such that it can move inside the bifurcation of the first leg, the flat side of the double return bent member being mounted on the free end of the pressure responsive member, mounting means on said first leg for the adjacent ends of said links, mounting means on said second leg for connecting the pressure responsive means to the instrument mechanism, and a plurality of adjustment means on the double return bent member, one for adjusting the amount of compensation utilized and another for a zero adjustment means for the instrument.

9. In a device employing a pressure responsive member having movement along a predetermined axis; a temperature responsive member secured to said pressure responsive member at one end of said axis; a second member secured to said pressure responsive member at the other end of said axis; said temperature responsive member extending toward said other end of said axis; a connecting element between said temperature responsive member and said second member; a respective adjustable positioning means located at each end of said connecting element for adjusting the angularity thereof relative to said axis.

10. In a device employing a pressure responsive member having movement along a predetermined axis; a temperature responsive member secured to said pressure responsive member at one end of said axis; a second member secured to said pressure responsive member at the other end of said axis; said temperature responsive member extending toward said other end of said axis; a connecting element between said temperature responsive member and said second member; adjustable positioning means located at each end of said connecting element, the positioning means located at the end of the connecting element at the temperature responsive member being variable to predetermined positions; the positioning means located at the end of the connecting element at the second member being variable over a range by infinitely small increments.

11. In a device employing a pressure responsive member having movement along a predetermined axis; a temperature responsive member secured to said pressure responsive member at one end of said axis; a second member secured to said pressure responsive member at the other end of said axis; said temperature responsive member extending toward said other end of said axis; a connecting element between said temperature responsive member and said second member; adjustable positioning means for each end of said connecting element located at respective ends; the positioning means at one end of the connecting element being variable to predetermined positions; the positioning means at the other end of the connecting element being variable over a range by infinitely small increments.

12. In a device employing a pressure responsive member having movement along a predetermined axis; a temperature responsive member secured to said pressure responsive member at one end of said axis; a second member secured to said pressure responsive member at the other end of said axis; said temperature responsive member extending toward said other end of said axis; a connecting element between said temperature responsive member and said second member; adjustable positioning means located at each end of said connecting element; the positioning means at one end of the connecting element being variable to predetermined positions; the positioning means located at the other end of the connecting element being variable over a range by infinitely small increments; the first-mentioned of said positioning means comprising a coarse setting of the angle of thrust between said temperature responsive member and said second member; the second-mentioned of said positioning means comprising a fine setting of said angle of thrust.

13. In a device employing a pressure responsive member having movement along a predetermined axis; a temperature responsive member secured to said pressure responsive member at one end of said axis; a second member secured to said pressure responsive member at the other end of said axis; said temperature responsive member extending toward said other end of said axis; a connecting element between said temperature responsive member and said second member; adjustable positioning means located at each end of said connecting element; the positioning means at one end of the connecting element being variable to predetermined positions; the positioning means located at the other end of the connecting element being variable over a range by infinitely small increments; the first-mentioned of said positioning means comprising a coarse setting of the angle of thrust between said temperature responsive member and said second member; the second-mentioned of said positioning means comprising a fine setting of said angle of thrust; and an indicator; a connection between said second member and said indicator.

14. In a device employing a pressure responsive member having movement along a predetermined axis; a temperature responsive member secured to said pressure responsive member at one end of said axis; a second member secured to said pressure responsive member at the other end of said axis; said temperature responsive member extending toward said other end of said axis; a connecting element between said temperature responsive member and said second member; adjustable positioning means located at each end of said connecting element; the positioning means at one end of the connecting element being variable to predetermined positions; the positioning means located at the other end of the connecting element being variable over a range by infinitely small increments; the first-mentioned of said positioning means comprising a coarse setting of the angle of thrust between said temperature responsive member and said second member; the second-mentioned of said positioning means comprising a fine setting of said angle of thrust; an indicator; a connection between said second member and said indicator; an adjusting element for varying the relative position of said connection and indicator on the one hand and said second member on the other hand.

15. In a device employing a pressure responsive aneroid having a fixed end and a free end, a temperature responsive member for producing a temperature compensation for the position of the aneroid under a pressure condition having a fixed portion and a free end, a second member mounted on the free end of said pressure responsive aneroid, a connection between the free end of said temperature responsive member and said second member for transmitting said temperature compensation from said temperature responsive member to said second member, the position of said connection being adjustable by means located at both ends thereof to vary the temperature compensating force applied to the aneroid.

16. In a device employing a pressure responsive member having movement along a predetermined axis; a flexible temperature responsive member secured to said pressure responsive member at one end of said axis, a second member secured to said pressure responsive member at the other end of said axis; said temperature responsive member extending to a point adjacent said other end of said axis; a relatively rigid connecting element between said temperature responsive member and said second member; a respective adjustable positioning means located at each end of said connecting element for adjusting the angularity thereof relative said axis.

17. In a device employing a pressure responsive member having movement along a predetermined axis; a flexible temperature responsive member secured to said pressure responsive member at one end of said axis; a second member secured to said pressure responsive member at the other end of said axis; said temperature responsive member extending to a point adjacent said other end of said axis; a relatively rigid connecting element between said temperature responsive member and said second member; adjustable positioning means located at each end of said connecting element; the positioning means at the end of the connecting element at the temperature responsive member being variable to predetermined positions; the positioning means at the end of the connecting element at the second member being variable over a range by infinitely small increments.

18. In a device employing a pressure responsive member having movement along a predetermined axis; a flexible temperature responsive member secured to said pressure responsive member at one end of said axis; a second member secured to said pressure responsive member at the other end of said axis; said temperature responsive member extending to a point adjacent said other end of said axis; a relatively rigid connecting element between said temperature responsive member and said second member; adjustable positioning means located at each end of said connecting element; the positioning means at one end of the connecting element being variable to predetermined positions; the positioning means at the other end of the connecting element being variable over a range by infinitely small increments; the first-mentioned of said positioning means comprising a coarse setting of the angle of thrust between said temperature responsive member and said second member; the second-mentioned of said positioning means comprising a fine setting of said angle of thrust.

EMIL KNAPP.

REFERENCES CITED

The following references are of record in the file of this patent:

UNITED STATES PATENTS

| Number | Name | Date |
| --- | --- | --- |
| 2,140,704 | Kollsman | Dec. 20, 1938 |
| 2,324,666 | Angst | July 20, 1943 |